United States Patent [19]
Kuhn et al.

[11] Patent Number: 5,546,794
[45] Date of Patent: Aug. 20, 1996

[54] DEVICE FOR MEASURING THE MASS OF A FLOWING MEDIUM

[75] Inventors: Ulrich Kuhn, Renningen; Dieter Tank, Eberdingen; Uwe Konzelmann, Asperg, all of Germany

[73] Assignee: Robert Bosch GmbH, Stuttgart, Germany

[21] Appl. No.: 339,198

[22] Filed: Nov. 10, 1994

[30] Foreign Application Priority Data

Dec. 1, 1993 [DE] Germany ............................ 43 40 882.6

[51] Int. Cl.$^6$ .................................................. G01M 19/00
[52] U.S. Cl. ........................................ 73/118.2; 73/861.22
[58] Field of Search ................................ 73/118.2, 198, 73/861.22

[56] References Cited

U.S. PATENT DOCUMENTS

| | | | |
|---|---|---|---|
| 3,116,693 | 1/1964 | Bird | 73/194 |
| 4,280,360 | 7/1981 | Kobayashi et al. | 73/198 |
| 4,418,578 | 12/1983 | Blechinger | 73/861.22 |
| 4,561,302 | 12/1985 | Sumal et al. | 73/118.2 |
| 5,209,113 | 5/1993 | Sawada et al. | 73/118.2 |
| 5,415,029 | 5/1995 | Uchiyama et al. | 73/118.2 |

FOREIGN PATENT DOCUMENTS

| | | |
|---|---|---|
| 0087621 | 8/1983 | European Pat. Off. . |
| 2845661 | 7/1987 | Germany . |

Primary Examiner—Richard Chilcot
Assistant Examiner—Jewel V. Artis
Attorney, Agent, or Firm—Edwin E. Greigg; Ronald E. Greigg

[57] ABSTRACT

A devices for measuring the mass of a flowing medium, having a temperature-sensitive measuring element, in which accurate medium flow measurement can be made in the presence of a pulsating flow which is characterized by flow fluctuations. In order to provide accurate measurements, the device has a structure which is installed in the measuring conduit in a region of its inside wall upstream and downstream of the measuring element. The structure has friction faces exposed to the oncoming flow in which the friction faces effect a flow resistance which can be varied by the intensity of the flow fluctuations, only in the presence of a pulsating flow, so that the flow is positively displaced more or less into the region of the measuring element, in order to increase the flow velocity and to compensate for the measurement errors. The invention is for measuring the mass of a flowing medium in the intake of an internal combustion engine.

10 Claims, 2 Drawing Sheets

, 794

DEVICE FOR MEASURING THE MASS OF A FLOWING MEDIUM

BACKGROUND OF THE INVENTION

The invention is based on a device for measuring the mass of a flowing medium as defined hereinafter. European patent 0 087 621 discloses a device in which to measure the mass of a flowing medium, particularly the intake air mass of an internal combustion engine, a measuring element, for example in the form of a hot wire, is disposed in a bypass conduit that is offset from a main intake conduit. Considerable fluctuations or pulsations of the flow velocity arise in the bypass conduit from the opening and closing of the injection valves of the individual cylinders of the engine, the intensities of which depend upon the intake frequency of the individual pistons or the engine speed. These flow fluctuations, namely the flow velocity prevailing on average in the bypass conduit and the intake air mass of the engine that can be calculated from it, distort the measuring result considerably, and in fact in such a way that depending on the intensities of the pulsations of the flow velocity, for example in the partial load range of the engine, the result may be an overly low reading for the mean flow velocity, and a overly high reading when the throttle valve is completely open. In the device mentioned at the beginning, longitudinal and cross sectional proportions of the main intake conduit and bypass conduit are chosen in order to reduce these measurement errors, which arise only during pulsating flow, these proportions being arrived at by means of calculations and numerous measurements; the position of the measuring element in the bypass conduit is specified. On the one hand, this considerably reduces the structural design and installation options for the device, and on the other hand, the embodiment of the device with a bypass conduit requires a large space, so that when the available installation space is tight, particularly in the intake region of the engine, it is only limitedly possible to install the device.

German patent document 28 45 661 discloses a device in which a hot wire is provided as a temperature-dependent measuring element; it is disposed in a measuring conduit, in a medium to be measured, by means of an securing sleeve. The securing sleeve is necessary in order to tender the hot wire by means of support hooks on the inside wall of the securing sleeve. The securing sleeve has a relatively small inside diameter so that on the one hand the flow past it is nearly unchecked between an outer face of the securing sleeve and an inner wall of the measuring conduit without being influenced by the securing sleeve, and on the other hand, a flow aligned as parallel as possible on the inside of the securing sleeve bathes the hot wire; the variance of the measurement value described at the beginning sets in when the flow pulsates.

OBJECT AND SUMMARY OF THE INVENTION

The device for measuring the mass of a flowing medium according to the invention has the advantage over the prior art that a uniformly precise measuring result can be produced virtually regardless of a fluctuating flow.

Advantageous modifications and improvements of the device indicated are possible by means of the measurements herein.

It is especially advantageous that the device, which is distinguished by its compact construction, demands only a slight amount of space so that it is particularly suitable for tight installation conditions.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 2:
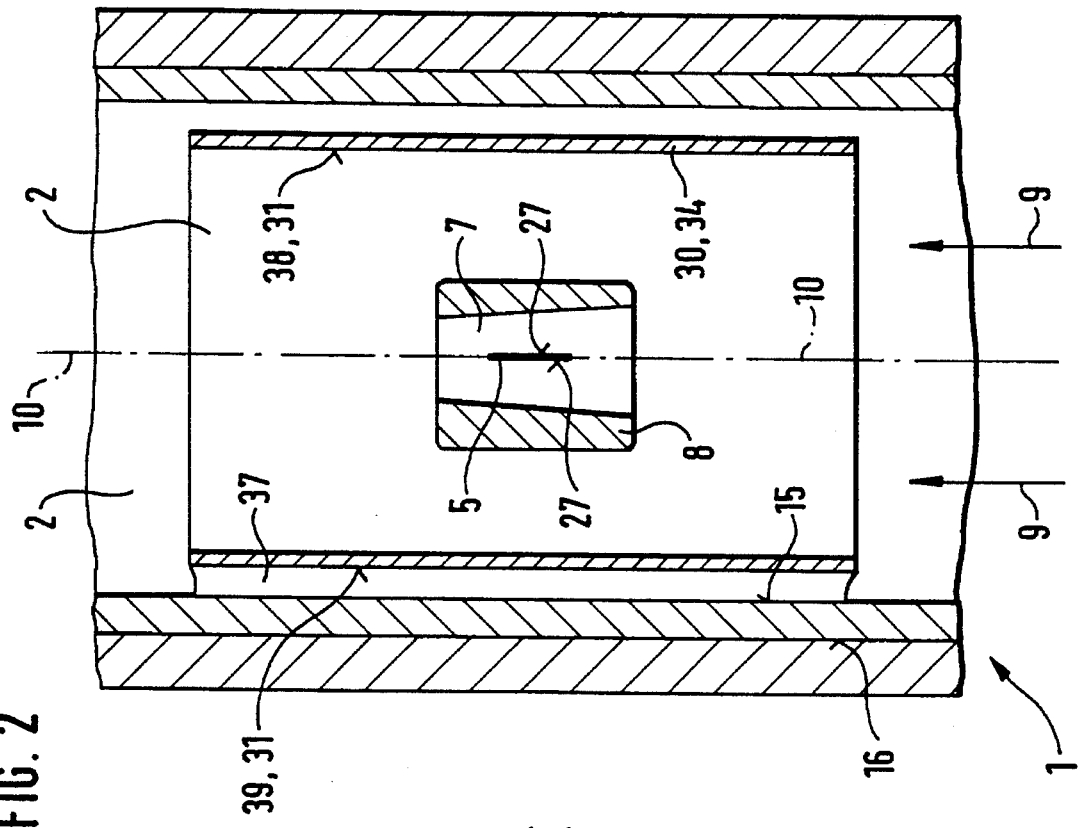
FIG. 2 shows a section along the line II—II in FIG. 1.
Figure 1:
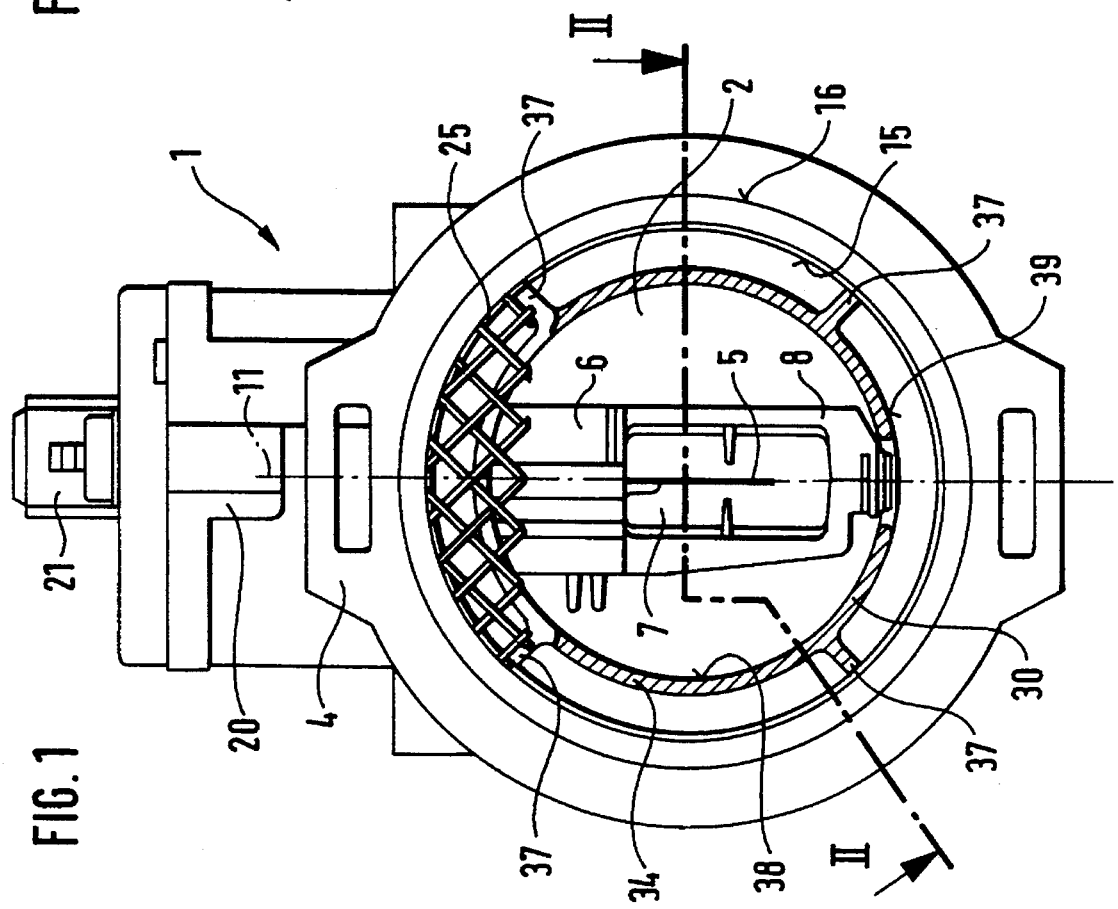
FIG. 1 shows a partial section of a first exemplary embodiment of the device according to the invention.

The device 1, shown in partial section in FIG. 1, serves to measure the mass of a flowing medium, particularly of the intake air mass of internal combustion engines. The device 1 has a tubular shape and is installed as a mountable intermediate piece in a connection line by means of connecting flanges provided on the ends, by which line the engine takes air from the environment in from an air filter, not shown; this air flows in the connection line into the device 1 for measuring the intake air mass such that from this device 1. The air reaches a throttle valve connection piece, not shown, which is provided for controlling the intake air mass, and hence reaches a combustion chamber of the engine. The device 1 has a measuring conduit 2 of cylindrical shape, for example, which extends through the device 1 centrally relative to a longitudinal axis 10. A measuring element 5 for measuring the intake air mass is disposed in the measuring conduit 2 along the axis, roughly midway along its axial length. The longitudinal axis 10 in FIG. 2 shows the plane of the drawing of FIG. 1. The measuring element 5 is embodied for example as a platelike ceramic substrate and, as may be learned from the prior art, for example German patent disclosure document 38 44 354, U.S. Pat. No. 4,976,145 which is incorporated by reference, it has one or more temperature-dependent resistors, which are applied to the platelike ceramic substrate in the form of resistive coatings, known as hot-film resistors. The individual resistive coatings of the measuring element 5 are electrically connected by means of connection lines, which lead out of the measuring conduit 2, to an evaluation circuit for example having a resistance measurement circuit, which resembles a bridge. The resistance measurement circuit is accommodated for example outside the measuring conduit 2 in a boxlike housing part 20, which is formed on the outside wall 16 of the device 1. By means of a plug connection 21 provided on the housing part 20, the electrical signals, which are placed in readiness by the evaluation circuit, are supplied for evaluation for example to a control device, which is provided for electronic idling control or motor power control of the engine. A description of the function and design of temperature-dependent measuring elements is not necessary since the specialist can infer this from the prior art.

To secure the measuring element 5, a carrier body 6 is provided, which is slim and cylindrical, for example, and protrudes into the flowing medium in the middle of the measuring conduit 2, toward a transverse axis 11 oriented perpendicular to the longitudinal axis 10. As shown in FIG. 1, the platelike measuring element 5 is held on one side, for example inside a carrier opening 7 made in the carrier body 6, on a narrow end of the carrier body 6, so that the measuring element 5, as is shown in FIG. 2, is disposed roughly midway along the axial length of the measuring conduit 2 and, with its two side faces 27 roughly parallel to the longitudinal axis 10, and is bathed by the flowing medium. It is also possible to install the measuring element 5 in the measuring conduit 2 without an outer, quasi-freely protruding rim formed by the carrier body 6 and secured to the narrow end of the measuring element 5. The flow direction is indicated by corresponding arrows 9 in FIG. 2, in a section taken along line II—II in FIG. 1, and in FIG. 4, in a section taken along a line IV—IV in FIG. 3. The carrier body 6 is embodied for example as a pluggable element and is pluggably inserted in a through opening, which runs through an inside wall 15 of the measuring conduit 2 and the outer wall 16 of the device 1, and is held against the outer face 16 of the device 1 in the region of the boxlike housing part 20, for example. To protect the measuring element 5 against contamination from the flowing medium and particularly to protect against engine backfires, two protective gratings 25 are provided for example in the inflow region and the outflow region of the measuring conduit 2 through which the flowing medium can flow virtually unchecked.

The device 1 has means 30, shaped according to the invention and provided upstream of the measuring element 5, for influencing the flow; they have friction faces 31 in order to compensate for a measurement error occurring when there is a pulsating flow characterized by flow fluctuations, particularly when the measuring element 5 is thermically sluggish, an example being hot-film resistors. The pulsations in the flow velocity result from the opening and closing of the intake valves of the individual cylinders of the engine; the power of the pulsations depends upon the intake frequency of the individual pistons or upon the speed of the engine and upon the intake air mass flowing into the measuring conduit 2. The temperature-sensitive measuring element 5 is heated to an excess temperature, which is elevated compared to the flowing medium, and as a result of convection, emits heat to the flowing medium; the heat quantity depends on the flow velocity prevailing in the measuring conduit 2. Due to the convective emission of heat, which is due to nonlinear physical properties, the measuring element 5 has a nonlinear characteristic curve, as a result of which, when there is a pulsating flow and a pulsating emission of heat to the flowing medium, the measurement result does not match the actual flow velocity averaged over time in the measuring conduit 2, but rather diverges considerably from it, depending on the intensity of the pulsation, because of thermic inertia of the measuring element 5. In the partial load range of the engine, when there is a slight intake air mass, the result is a particularly serious overly low reading of the measurement value, and upon increasing pulsation intensity in the full load range and upon partial return flow of the flowing medium, the result is an overly high reading of the measurement value. The means 30 according to the invention, particularly installed upstream of the measuring element 5 in the measuring conduit 2, serve to improve measurement precision or to compensate for measurement error over a wide measurement range of the flow velocity of the device 1; in the region of the inside wall 15 of the measuring conduit 2, these means 30 effect a flow resistance that can be varied by the pulsation intensity of the flow, so that the divergence of the measurement value caused by the flow fluctuations, particularly the overly low reading when there are small pulsation amplitudes, is compensated for by an increase in flow resistance. Because the flow resistance is increased only when there is a pulsating flow in the region of the inside wall 15, the flow velocity is increased in the region of the measuring element 5, resulting in an increased heat dissipation to the flowing medium, in order to compensate for an overly low reading of the measuring element 5. By means of the variable flow resistance, it is possible to produce a uniformly precise measurement result for a wide measurement range, virtually independently of the pulsation intensity of a fluctuating flow.

In the first exemplary embodiment of FIGS. 1 and 2, an inside sleeve 34 is provided as the means 30; with an inside face 38 and an outside face 39, this sleeve forms friction faces 31 at which the flow along them, if it is pulsating, is more or less impeded by flow effects that arise, such as eddies induced at the friction faces 31, or separations from the inside wall 15 caused by the pressure drop; as a result, in the region of the inside wall 15, there is a variable flow resistance that depends on the pulsation intensity, in order that particularly when there is an overly low reading, the flow will be positively displaced by an increased flow resistance in the region of the inside wall 15 into the inside region of the measuring conduit 2 having the measuring element 5, the result in turn being that an increased flow velocity prevails in the inside region of the measuring conduit 2 in comparison with a non-pulsating flow, in order thereby to increase the emission of heat of the measuring element 5, so that the flow velocity averaged over time is almost equivalent to the actual mean flow velocity.

The inside sleeve 34 is disposed axially in the middle relative to the measuring element 5 so that, particularly upstream and downstream of the measuring element 5, friction faces 31 are provided that are oriented roughly parallel to the flow direction 9; the axial length of the inside sleeve 34 should be adapted to the expected pulsation intensity. For the intake air mass flow of an engine to be measured, it has come to light that the axial length of the inside sleeve 34 should come out to roughly once to twice the inside diameter of the measuring conduit 2; the inside sleeve 34 should be embodied as having as slight wall thickness as possible and should be provided with the inside face 38 and the outside face 39 close to the inside wall 15 of the measuring conduit 2. A radial space measured from the inside wall 15 to the outside face 39 of the inside sleeve 34 may amount at most to roughly one-seventh of the inside diameter of the measuring conduit 2.

To secure it, the inside sleeve 34 has connection struts 37, four in number for example, which extend radially outward from the outer face 39 and are spaced apart circumferentially by an angle of roughly 90° to 120°, for example, in order to hold the inside sleeve 34, for example by clamps, in contact with the inside wall 15 of the measuring conduit 2. It is also possible to fasten the connecting struts 37 to the inside wall 15.

Figure 4:
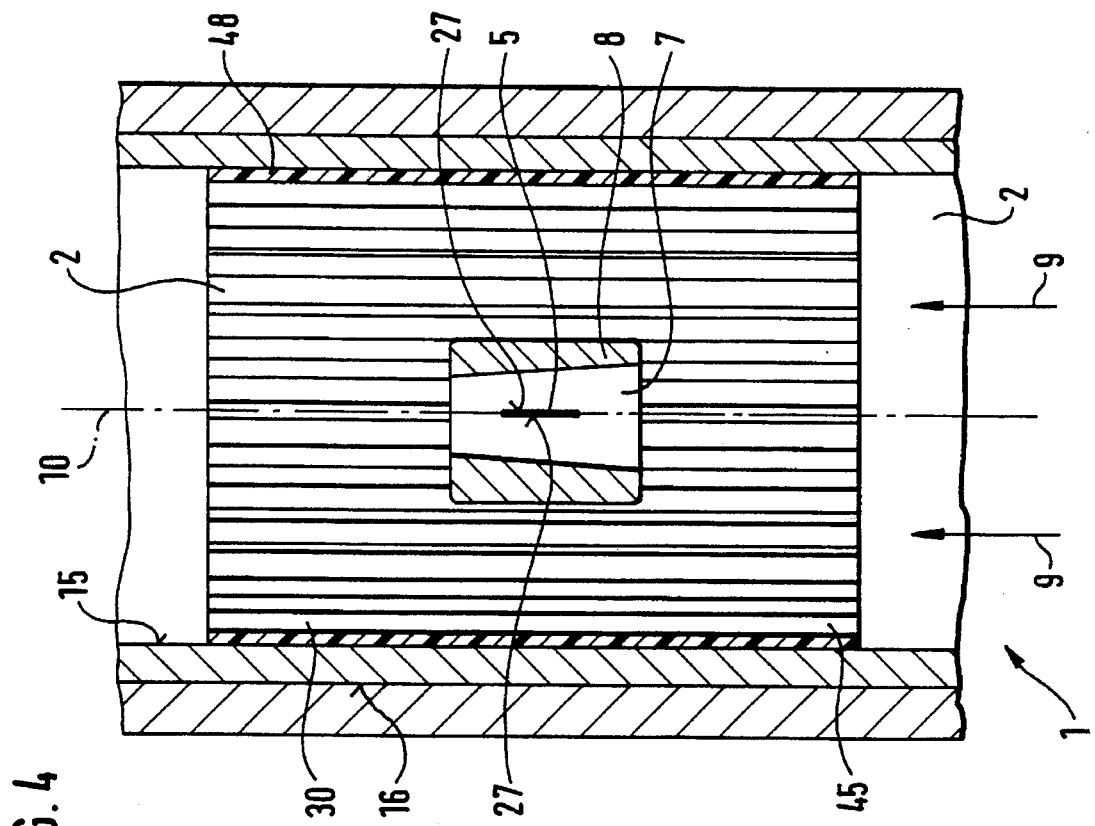
FIG. 4 shows a section of the second exemplary embodiment along the line IV—IV in FIG. 3.
Figure 3:
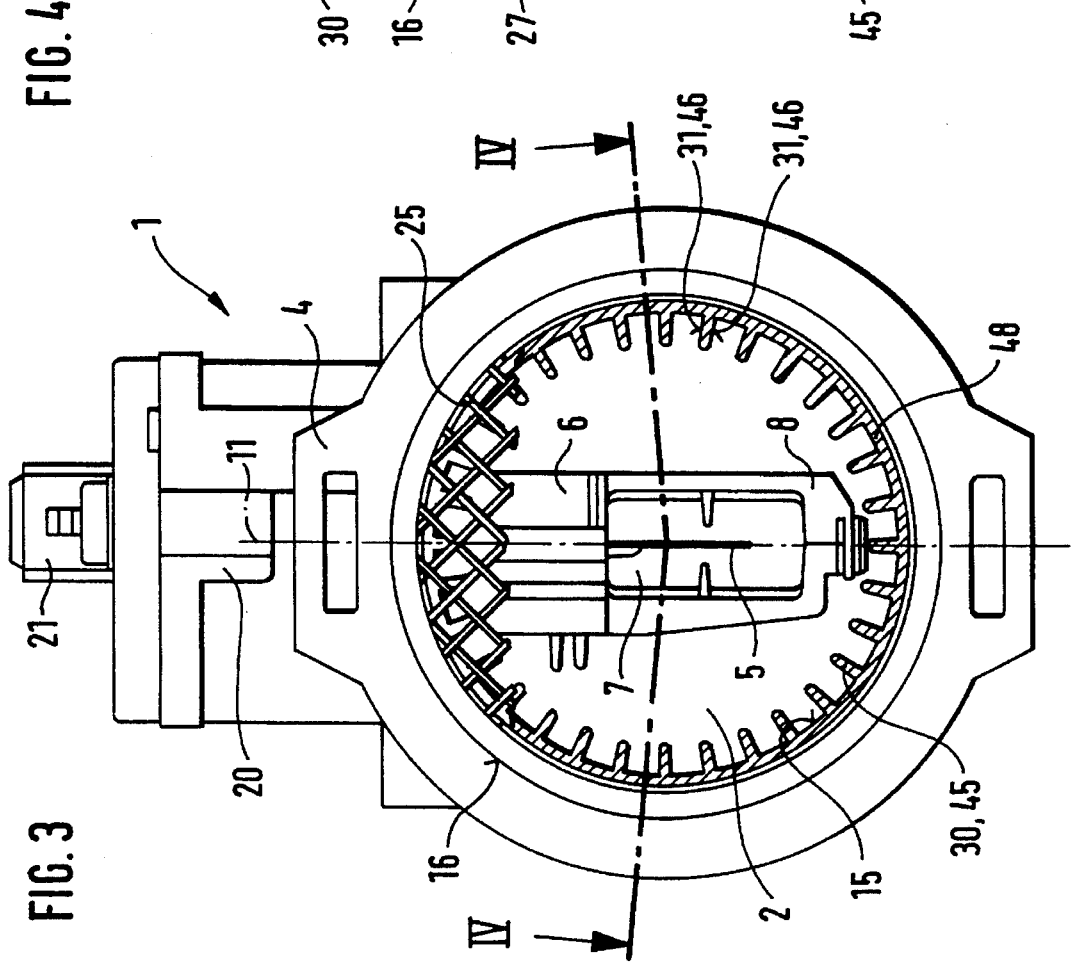
FIG. 3 shows a partial section of a second exemplary embodiment of the device according to the invention.

FIGS. 3 and 4 show a second exemplary embodiment of a device 1 according to the invention for measuring the mass of a flowing medium; all identical or identically functioning parts are indicated with the same reference numerals as in the first exemplary embodiment in FIGS. 1 and 2. FIG. 3 shows a partial section of the device 1 embodied according to the invention in which, diverging from the first exemplary embodiment, instead of the inside sleeve 34, individual laminas 45 are embodied as means 30 for influencing the flow, which laminas 45 are provided at least upstream of the measuring element 5 and which extend radially inward from the inside wall 15 of the measuring conduit 2; at most, the radial length of the laminas 45 may amount to roughly one-fourth of the inside diameter of the measuring conduit 2. The individual laminas 45 are provided on the inside wall 15, particularly upstream and downstream of the measuring element 5, and each have a radial outer face 46 oriented approximately parallel to the longitudinal axis 10, in order to obtain friction faces 31 with the individual outer faces 46 of the laminas 45, which friction faces 31 influence the flow resistance in the region of the inside wall 15 of the measuring conduit 2 only in the presence of pulsating flow, as described in the first exemplary embodiment. To measure the intake air mass of internal combustion engines, the individual laminas 45 advantageously have an axial length that amounts to approximately once to twice the inside diameter of the measuring conduit 2. The number of the laminas 45 is adapted to correspond to the pulsation intensity of the flow and to the desired measurement range of the flow velocity. For example, laminas 45 which are disposed on the circumference of the inside wall 15, spaced apart by an angle of from 10° to 20°, are suitable for the measurement range of an internal combustion engine. The laminas 45 can be embodied for example of plastic and can be produced using plastics injection molding technology. The laminas 45 can be provided for example on an inside wall of an additional plastic sleeve 48; the plastic sleeve 48 can be for example pluggably placed in a radial recess of the inside wall 15 of the measuring conduit 2. The laminas 45 can also be sprayed directly onto the inside wall 15 of the measuring conduit 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for measuring the mass of a flowing medium of an intake air mass of an internal combustion engine, comprising a measuring conduit within said device (1), a carrier body that secures a measuring element in said measuring conduit with the flowing medium passing the measuring element, said measuring element serves to measure the mass of the flowing medium, at least upstream of the measuring element (5) means (30) that have friction faces (31) are placed in the measuring conduit (2) in a region spaced from an inside wall (15) of the measuring conduit (2) and are exposed to an oncoming flow medium.

2. The device according to claim 1, in which the means (30) are provided upstream and downstream of the measuring element (5).

3. The device according to claim 2, in which an inside sleeve (34) is embodied as the means (30), which sleeve, having an inside face (38) and an outside face (39), has friction faces (31) and is disposed radially spaced apart from an inside wall (15) of the measuring conduit (2).

4. The device according to claim 3, in which the inside sleeve (34) has an axial length that amounts to roughly one to two times an inside diameter of the measuring conduit (2).

5. The device according to claim 3, in which, a radial space measured from the inside wall (15) of the measuring conduit (2) to the outer face (39) of the inside sleeve (34) amounts to roughly one-seventh of the inside diameter of the measuring conduit (2).

6. The device according to claim 5, in which the inside sleeve (34) has connection struts (37) which lead from the outside face (39) of the inside sleeve (34) to the inside wall (15) of the measuring conduit (2).

7. A device for measuring the mass of a flowing medium of an intake air mass of an internal combustion engine, comprising a measuring conduit within said device (1), said measuring conduit including an inside wall (15) and an outside wall (16), a carrier body that secures a measuring element in said measuring conduit with the flowing medium passing the measuring element, said measuring element serves to measure the mass of the flowing medium, at least upstream of the measuring element (5), means (30) includes individual laminas (45) that have friction faces (31) placed in the measuring conduit (2), said friction faces extend radially inwardly from said inside wall (15) of the measuring conduit (2) and are exposed to an oncoming flow medium.

8. The device according to claim 7, in which the laminas (45) are disposed spaced apart along the circumference at an angle of about roughly 10° to 20°.

9. The device according to claim 7, in which the laminas (45) have an axial length that amounts to approximately one to two times an inside diameter of the measuring conduit (2) and extend upstream and downstream of said measuring element.

10. The device according to claim 7, in which the radial length of the laminas (45) amount to roughly one-quarter of the inside diameter of the measuring conduit (2).

* * * * *